Patented July 3, 1951

2,558,762

UNITED STATES PATENT OFFICE 2,558,762

CARRIER MATERIAL FOR AGRICULTURAL CHEMICALS

Donald A. Kohr, Jr., Chicago, Ill., and Roy L. Milde, La Fayette, Ind., assignors to The Sherwin-Williams Co., Cleveland, Ohio, a corporation of Ohio No Drawing. Application December 14, 1948, Serial No. 65,283

15 Claims. (Cl. 167—42)

This invention relates to carrier materials for agricultural chemicals; and to concentrates containing such carrier materials and active ingredients, which are capable of being mixed with water or other suitable diluents to form dispersions of active ingredients possessing numerous advantages.

It is often necessary or desirable to apply to the surfaces of plants various active ingredients such as those which act as herbicides, hormone-like growth regulators, fungicides, insecticides, antioxidants, or those which provide other effects. It is advantageous, particularly because of the convenience and saving in labor, if such active ingredient is dispersed in a liquid such as water, to form a dispersion which may be applied to the plants as by spraying.

It is desirable that the active ingredient be completely and finely dispersed in such a dispersion, and that the dispersion be stable for substantial periods, even though the active ingredient be one which is relatively insoluble in water. This is to permit the application of the active ingredient to plant surfaces by spraying, to effect a uniform dosage of the plant surfaces with the active ingredient and to make possible maximum effectiveness of the active ingredient.

It is also desirable that the dispersion be of such nature that after application to plant surfaces the active ingredient remains on such plant surfaces long enough to permit performance of its intended function, without impairment of the effectiveness of the active ingredient. For example, if the active ingredient is one which is to be retained on the plant surfaces, as for fungicidal or insecticidal purposes, it should be held on the plant surfaces for as long a period as possible in order to perform its biocidal functions. If the active ingredient is one which is to be absorbed into the plant, as for hormone-like growth regulation or herbicidal purposes, it should be held on the plant surfaces for a time long enough to permit sufficient amounts of the ingredient to be absorbed by the plant to achieve the desired functions; and the absorption of the active ingredient should be facilitated or promoted if possible.

Moreover, after application of the dispersion containing the active ingredient to the plant surfaces, the active ingredient should resist washing off of the plant surfaces by subsequent applications of water, as by subsequent rainfall or sprinkling. In cases where the dispersion containing the active ingredient is to be applied to plants growing in or surrounded by water, as aquatic weeds in rice fields or drainage ditches, the dispersion should be such that the active ingredient can contact the plant surfaces and remain thereon in sufficient dosage to perform its intended function without being lost in the surrounding water to such an extent that it is ineffective.

These last desiderata impose the problem of satisfying two apparently wholly incompatible requirements: the requirement that the active ingredient be dispersed in water for application to the plant surfaces, and the requirement that after the active ingredient has been applied to the plant surfaces it should not be removed or otherwise rendered ineffective by water subsequently applied or surrounding the plant.

These are but some of the features desired in dispersions of active ingredients to be applied to plant surfaces.

It is also desired that the active ingredient be incorporated in a concentrate which can be readily mixed with suitable diluents such as water or other suitable liquids, to form a dispersion satisfying these desiderata. Such a concentrate is desirable because it obviates the necessity of packaging or transporting large quantities of water or other diluents, which would greatly increase costs.

It has been proposed heretofore to make dispersions containing an active ingredient comprising an agricultural chemical and an adjuvant intended to promote some of the desired features and functions set forth above; it has also been proposed to use concentrates comprising such an active ingredient and an adjuvant which could be mixed with water to form such dispersions.

However, in general such adjuvants did not provide concentrates or dispersions satisfying the desiderata set forth above. The concentrates and dispersions, for example, usually lacked the desired degree of dispersion and stability, particularly if the active ingredient had low water solubility. They were often difficult to prepare. The dispersions often required intensive mixing or special mixing equipment to achieve even a moderate dispersion of the active ingredient. After such dispersions were applied to plant surfaces, the effectiveness of the active ingredient was often impaired or the active ingredient was not held on the plant surfaces as long as necessary to provide full effectiveness. Usually, such dispersions did not provide the desired spreading and uniform dosage of the active ingredient and hence also impaired effectiveness in this manner. Few, if any, prior dispersions provided a solution to the particular problem of permitting application of the active ingredient to plant surfaces in a water dispersion, while insuring that the active ingredient is not rendered ineffective by water subsequently applied to or surrounding the plant. Such prior concentrates and dispersions also had other shortcomings.

It is an object of this invention to provide a carrier material for agricultural chemicals which makes possible the production of concentrates and dispersions satisfying the desiderata set forth above and possessing other advantages and that is free of the disadvantages of prior concentrates and dispersions.

It is another object of this invention to provide a concentrate comprising a carrier material and an active ingredient, capable of being mixed with water or other suitable diluent to form a dispersion containing a desired concentration of active ingredient, which overcomes the shortcomings of prior concentrates and satisfies the desiderata set forth above.

These and other objects, features, and advantages of the invention will be more fully apparent from the following description of the invention and from the claims.

For the purposes of clarity, the invention in its more particular aspects will be described hereinafter under the following items arranged in the following order: composition of the carrier material and the nature of its component ingredients; active ingredients employable in conjunction with the carrier material; composition of the concentrates embodying the carrier material; critical nature and proportions of the components of the carrier material and concentrate; examples of carrier materials and concentrates embodying the invention; functions and advantages of the carrier material and concentrate as such, and in dispersions before and after application to plants; functions and advantages of the carrier material in inhibiting deleterious effects of water after application of active ingredient; and functions and advantages of the carrier material when employed with certain halogenated phenoxy acid esters.

COMPOSITION OF CARRIER MATERIAL

The carrier material of the present invention in concentrated form essentially comprises, apart from the active ingredient, an oil, a coupling agent, and a surface-active agent; the surface-active agent constitutes from about 20% to 200% by weight of the coupling agent, and the surface-active agent and coupling agent together constitute by weight from about 20% to about 300% of the oil. The carrier material, before being mixed with water, contains no more than traces of water. The ingredients of the carrier material are of such natures and are combined in such proportions that they cooperate to provide important and unique results and advantages discussed more fully hereinafter.

Oil

The oil is a substantially pure petroleum hydrocarbon distillate containing a major proportion of paraffinic constituents and between about 75% and about 85% unsulfonatable material; that is, a test of the oil by ASTM Test Method D483-40 shows between about 75% and about 85% unsulfonated residue, or in other words, that the oil contains from about 15% to about 25% of materials reactable with sulfuric acid under the conditions of and as measured by said test. ASTM Test Method D483-40, entitled "Unsulfonated Residue of Plant Spray Oils" is described at pages 257-259 of "1944 Book of ASTM Standards, Part III, Non-Metallic Materials—General," published by American Society for Testing Materials, Philadelphia, Pa. The oil has a viscosity between about 40 seconds and 70 seconds Saybolt Universal at 100° F. It is substantially pure in the sense that it consists wholly, or almost wholly, of hydrocarbons and contains no more than traces of compounds such as those containing oxygen, sulphur, nitrogen or metals. An oil may be employed which has been prepared by mixing together two or more petroleum distillates which individually may have characteristics, such as unsulfonatable residue falling out of the above ranges, but which when combined form an oil of the above indicated characteristics.

Coupling agent

The coupling agent may consist of an alcohol having up to 8 or more carbon atoms, and/or an alkylene glycol alkyl ether, such as, for example, those compounds commonly known by the trade names "Cellosolves" and "Carbitols."

In addition to these compounds, other materials may be used as coupling agents such as diacetone and ethylene glycol monoethyl ether acetate, known by the trade name "Cellosolve Acetate."

Although some of these compounds are not coupling agents in a strict technical sense, they all perform the function of a coupling agent in the present invention and will be so termed in the specification and claims.

Generally these compounds may be used singly as a coupling agent or two or more may be used in combination.

As examples of the alcohols, the following have been found to act as coupling agents in the carrier material: methyl alcohol, ethyl alcohol, denatured ethyl alcohol, n-propyl alcohol, isopropyl alcohol, n-butyl alcohol, isobutyl alcohol, secondary butyl alcohol, tertiary butyl alcohol, n-amyl alcohol, isoamyl alcohol, tertiary amyl alcohol, 3 methoxy butanol-1, n-hexyl alcohol, diacetone alcohol, 2-ethyl butyl alcohol, 4-methylpentanol-2, heptanol-2-(methyl amyl carbinol), and octyl alcohol.

The glycol ethers which are satisfactory for use as coupling agents are exemplified by the following: ethylene glycol monomethyl ether, ethylene glycol monoethyl ether, ethylene glycol monobutyl ether, ethylene glycol diethyl ether, diethylene glycol monoethyl ether, diethylene glycol diethyl ether, propylene glycol methyl ether, propylene glycol isopropyl ether, dipropylene glycol methyl ether and tripropylene glycol methyl ether. Although any one or a combination of the foregoing agents may be used, the preferred compound is ethylene glycol monobutyl ether, known as "Butyl Cellosolve." However, when it is desired to partially or completely replace this compound with another compound, it is preferred to use one of the alcohols as the substitute such as isopropyl alcohol. It has been found that a blend of isopropyl and tertiary butyl alcohol forms an effective coupling agent. All of the alcohols in the above list are acceptable and can be substituted one for the other, although methyl alcohol, denatured ethyl alcohol and 3-methoxy butanol-1 are the least preferable and would be used only in cases where none of the other alcohols or glycol ethers were available.

In addition to the ethylene glycol monobutyl ether, propylene glycol isopropyl ether, dipropylene glycol methyl ether and tripropylene glycol methyl ether are exceptionally good coupling agents.

The reason for preferring one compound to another lies in the fact that the preferred compounds produce clear concentrates which readily form dispersions with water. The less desirable coupling agents produced satisfactory concentrates and dispersions from a technical viewpoint but such concentrates are inclined under certain conditions to be slightly cloudy thus reducing the marketability and salability of such products, both because of their appearance and because of possible separation of constituents after long periods of storage.

Surface-active agent

The surface-active agent employed in the carrier material of the invention has the composition of the product produced as follows:

Any six-carbon atom, straight chain hexitol may be employed as the primary reactant, but it is advantageous to use sorbitol, mannitol or dulcitol, because of their availability; of these, sorbitol is preferred. The commercially pure grades of hexahydric alcohol may be employed. According to the preferred method, one or more hexitols and a substantially equimolecular proportion of stearic acid or oleic acid, or a mixture thereof, are reacted under conditions which result in formation of an inner ether from the hexitol and mono-esterification of the inner ether with the fatty acid. The inner ether is formed by intramolecular condensation of hydroxyl groups of the hexitol to form a cyclic ether ring; two hydroxyl groups may condense to form a single cyclic ring, but an inner ether having two such cyclic ether rings may be formed; the mono-cyclic inner ethers are preferred. The presence of a suitable catalyst promotes the reactions; acid catalysts such as sulphuric or phosphoric acid, or alkaline catalysts such as sodium hydroxide, may be employed, but acid catalysts are preferred since they promote the formation of the desired mono-esthers of mono-cyclic inner ethers of the hexitol.

The ingredients indicated above are mixed together and heated at a temperature of 150° C.–300° C. in a suitable container which is preferably closed and equipped with suitable agitating means. Preferably an inert gas, such as nitrogen or carbon dioxide, is passed over and through the reaction mass to remove the water produced as a by-product of the reaction and to prevent discoloration of the reaction mass. The reaction is preferably carried out under atmospheric or reduced pressure. The reaction is continued until it appears complete, which is indicated by a uniformly clear appearance of the reaction mass.

At this first stage, the reaction mass consists essentially of the mono-oleyl and/or mono-stearyl esters of mono-cyclic inner ethers of hexitol in which the hexitol residue has a plurality of unreacted hydroxyl groups. The reaction mass may also contain small amounts of other compounds, such as unreacted reactants, unesterified inner ether of hexitol, and esters of inner ethers of hexitol having more than one fatty acid radical and/or more than one cyclic ether ring. A similar reaction mass may be made by first treating the hexitol to effect inner ether formation, and then reacting the etherified hexitol with a substantially equimolecular proportion of stearic or oleic acid to form the monoester.

The above reaction mass is then, without separation of its components, heated under condensation conditions with from 3 to 6 molecular proportions of ethylene oxide or other substance capable of forming ethylene oxide under the reaction conditions. Condensation is obtained by heating these reactants to a temperature between about 80° C. and about 200° C., and preferably between 100° C. and 150 C., at atmospheric or preferably superatmospheric pressure, such heating is continued until the ethylene oxide is completely reacted. It is advantageous to employ condensation catalysts in the reaction mass; such catalysts may be the catalytic materials mentioned above, or other catalytic materials such as bleaching earths or active charcoal. The condensation reaction apparently results in the formation of polyethenoxy chain radicals, containing a plurality of ethenoxy ($-O-C_2H_4-$) groups, which become connected to the hexitol residue through some or all of the remaining unesterified and unetherified hydroxyl groups of the esterified inner ether of the hexitol.

The surface-active agent of the invention is the resulting product. While the exact composition of such product is not known and appears impossible of determination by chemical analysis, the final product apparently essentially comprises an inner mono-cyclic ether of a hexitol of which the hydrogen of one hydroxyl group is substiuted by an oleyl or stearyl radical and which has polyethenoxy chain radicals (radicals containing a plurality of $-O-C_2H_4-$ groups) connected at some or all of the remaining hydroxyl groups. The polyethenoxy radicals correspond in amount to about 3 to 6 mols of ethylene oxide per mol of esterified inner ether of hexitol; that is, the number of ethenoxy radicals in the compound corresponds to the number which would be present if the esterified inner ether of hexitol was reacted with ethylene oxide in the proportions of 3 to 6 molecular proportions of ethylene oxide per molecular proportion of esterified inner ether of hexitol or, what is the same, per molecular proportion of the original hexitol. There may be present in the reaction product and, hence, in the surface-active agent, small amounts of other substances, such as those mentioned above in the first stage reaction product as well as ethenoxy derivatives of such substances. In the surface-active agent employed in the invention, the polyethenoxy chains and cyclic ether group impart pronounced hydrophilic properties, and the fatty acid radical imparts pronounced lipophilic properties. The material therefore has high surface activity and also acts as a coupling, spreading, and sticking agent in the compositions of the invention.

ACTIVE INGREDIENTS EMPLOYABLE IN CONJUNCTION WITH CARRIER MATERIAL

The active ingredient which may be employed in conjunction with the carrier material of the invention in general may consist wholly or in part of any agricultural chemical which is to be applied to plant surfaces and which should remain on the plant surfaces for a substantial period of time to permit it to be absorbed by the plant or to permit it to perform some other desired function. The active ingredient should also be one which it is desired to disperse in water or other liquid for application to plant surfaces as by spraying, and the dispersion of which in such a liquid requires or is facilitated by the presence of an adjuvant. If the active ingredient is one which is to operate physiologically on the plant, it may be one the action of which is improved if its penetration into the plant is facilitated.

The active ingredient may consist wholly of one or more solid or liquid agricultural chemicals or may consist partly of one or more of such chemicals and partly of synergistic or protective compounds; an example of a protective compound is lime which is often used with certain arsenical compounds.

Such agricultural chemicals may include hormone-like growth regulators, exemplified by certain halogenated phenoxy monocarboxylic acids such as 2,4 dichlorophenoxy acetic acid and 2,4,5 trichlorophenoxy acetic acid, alpha naphthalene aliphatic acids such as alpha naphthalene acetic acid, phenoxy aliphatic acids such as phenoxy acetic acid, beta naphthoxy aliphatic acids such as beta naphthoxy acetic acid, phenyl aliphatic acids such as phenyl acetic and phenyl propionic acids, indole aliphatic acids such as indole acetic acid, indole butyric acid, and others, as well as esters, salts, amides or other derivatives of such acids. In general, such compounds, when applied to plants in light dosages, cause hormone-like responses in the plants without killing them, and when applied in sufficiently heavy dosages kill plants and hence may act as herbicides, often selectively. The alkyl esters of such hormone-like growth regulator acids may be employed to particular advantage in concentrates containing the carrier materials of the invention, since in general such esters are more soluble than the acids in such carrier materials; hence, such concentrates containing such esters, and dispersions prepared from such concentrates, are of increased stability.

Such active agricultural chemicals may also include herbicidal chemicals, in addition to those indicated above, such as sodium chlorate, dinitro-ortho-cresol and its sodium or other salts, ammonium sulfanate, ammonium thiocyanate, sodium arsenite, calcium cyanamide, and others.

The active agricultural chemicals also may include those having an insecticidal action, of which examples are lead and calcium arsenates, alkali or alkaline fluosilicates and fluoaluminates, organic thiocyanates, rotenone, basic copper arsenates, lime-sulphur compounds, DDT (dichloro-diphenyl-trichloroethane), chlorinated naphthalenes, and others.

The active agricultural chemicals may include those having fungicidal action. Examples of such chemicals are certain copper compounds, sulphur, and metal salts of dimethyl dithiocarbamate.

Certain of such chemicals may perform two or more functions; for example, basic copper arsenates and lime-sulphur compounds have both insecticidal and fungicidal properties, and dinitro-ortho-cresol and salts thereof have herbicidal, fungicidal and growth stimulating properties, depending on the amounts applied and the kinds of plants to which applied.

Chemicals capable of performing other functions, such as preservative chemicals, may also be included in the active agricultural chemicals employed in conjunction with the carrier material of the invention.

The terms "active ingredient" and "agricultural chemical" employed in the specification and claims are intended to have the meaning set forth above.

COMPOSITION OF CONCENTRATE

The carrier material preferably has dispersed therein a relatively high concentration of such active ingredient. Thus is provided a concentrate which may be mixed with water in a wide range of proportions to form a stable dispersion containing the active ingredient and carrier material in a desired concentration for application to plants.

The proportion of active ingredient which may be dispersed in the carrier material to form a concentrate is largely determined by the nature of the active ingredient, the purpose for which it is intended, and the concentration desired in the ultimate dispersion to be applied to the plant surfaces. The degree to which the active ingredient may be dissolved or otherwise dispersed in the carrier material has a bearing on the proportion. The amount of carrier material residue necessary to hold the active ingredient on the plant is relevant. The amount of carrier material necessary to form a stable dispersion of active ingredient in water also must be taken into account; and this is largely controlled by the degree of solubility or miscibility of the active ingredient in water, or the particle size, if the active ingredient is solid and relatively insoluble. When the active ingredient is a solid which is relatively insoluble in both the carrier material and water, it is advantageous if the particle size is extremely small.

As a general rule, the active ingredient will be substantially soluble in the carrier material if it is highly soluble in at least one component thereof, although some active ingredients will be quite soluble in the carrier material even though they are not highly soluble in any individual component thereof. In general, concentrates embodying the invention are most advantageous if the active ingredient is substantially soluble in the carrier material and if no more active ingredient is dispersed in the carrier material than is soluble therein. In such case, all the active ingredient present is dissolved in the carrier material. Such a prepared concentrate is extremely stable. From the concentrate one can readily prepare aqueous dispersions which are highly stable, contain the active ingredient in highly dispersed form, and provide to the fullest extent the advantages hereinafter set forth.

Although the above factors have a bearing on the amount of active ingredient dispersed in the carrier material, in general it is advantageous if active ingredient thus dispersed in the carrier material constitutes from about 2% to about 400% of the weight of the carrier material.

The carrier material may be readily made by thoroughly mixing the oil, coupling agent, and surface-active agent together at room or slightly elevated temperatures. These compounds are completely miscible in the proportions indicated. In the formation of a concentrate, it is preferable and most economical to add the desired amount of active ingredient to the components of the carrier material before, or during such mixing thereof; however, the carrier material may be prepared first and the active ingredient dispersed therein later.

If desired, the carrier material and active ingredient could be separately mixed with water to form the ultimate dispersion, but this procedure results in certain disadvantages and hence is not preferred. Thus, separate mixing of the active ingredient and carrier material with water not only involves an extra operation, but introduces added possibilities of error in obtaining the final concentrations. Such separate mixing also renders it difficult if not impossible to obtain complete and stable dispersion of the active ingredient in the water, whereas when the concentrate of the invention containing the active ingredient dispersed in the carrier material is mixed with water, complete and stable dispersion of the active ingredient in water is readily obtained. For example, certain relatively water-insoluble active ingredients can be readily dissolved in the carrier material to form a concentrate embodying the invention which can be readily mixed with water to form a stable dispersion in which the active ingredient is completely dispersed in water; whereas if such active ingredient and carrier material were separately mixed with water the active ingredient might be dispersed only with difficulty, if at all.

CRITICAL NATURE AND PROPORTIONS OF COMPONENTS OF CARRIER MATERIAL AND CONCENTRATE

The nature and the proportions of the components of the carrier material are highly critical. A coupling agent of the kind set forth above in the proportions set forth above is necessary to produce clear, homogeneous, stable concentrates, and stable ultimate dispersions, and to provide the advantages set forth hereinafter. While carrier materials have been produced without coupling agents, as set forth under the heading "Composition of carrier material," omission of the coupler results in an unsatisfactory product devoid of many of the advantages set forth herein. A particular advantage of the coupler has been found in that despite the varying quality of the water throughout the country, no difficulties have been experienced due to hardness of waters.

An oil of the kind set forth above in the proportions indicated above is also necessary to provide the advantages described herein and discussed in more detail hereinafter. Different proportions of oil or different kinds of oil appear to result in considerably decreased stability of concentrates embodying the carrier material and of the dispersions prepared from such concentrates and in failure to provide the herein described advantages on application to plant surfaces. In general, carrier materials embodying the invention containing oils of the kind and in the proportions specified above cause little if any damage to plant tissue; this feature is desirable when the carrier material is employed with agricultural chemicals in dispersions which are desired to leave plant tissue uninjured, such as dispersions intended to act as fungicides, insecticides, preservatives, or selective herbicides. In selective herbicides it has been affirmed by experience that if the oils damage the plant leaf tissues, the selective herbicides are prevented from translocation and in certain instances lose effectiveness thereby. Oils of different kinds or in different proportions often cause the carrier material to injure seriously or kill plant tissue.

A surface-active agent of the kind and in the range of proportions indicated above has been found necessary to provide the desired high degree of dispersion of the active ingredient in both the concentrated carrier material and in the ultimate dispersion, the desired high stability of the carrier material and of the ultimate dispersion, and the advantages set forth herein in application and functioning of the active ingredient on the plant surfaces.

Use of different concentrations of the indicated type of surface-active agent, or of different even though closely chemically related surface-active agents, causes considerable reductions in stabilities of the concentrated carrier material, of concentrates embodying the carrier material and an active ingredient, and of the ultimate dispersion, and causes the ultimate dispersion to lack the advantages described herein in the way of uniform spreading, sticking, effectiveness, etc., of the active ingredient. As with the oil, the surface active agent must not damage the leaf, for if it does so, translocation of growth regulating chemicals may be prevented. In order to have translocation the leaf cells must not be damaged.

EXAMPLES

The following are several specific examples of preferred carrier materials and concentrates embodying the invention, but the invention is not to be limited thereto:

*Example 1*

A concentrate having the following composition was prepared, all proportions being by weight:

27% of butyl 2,4 dichlorophenoxy acetate
73% of a carrier material of the following composition:
  Oil, 79.5%
  Coupling agent, 13.7%
  Surface-active agent, 6.8%

The oil was a pure petroleum distillate, consisting principally of paraffinic hydrocarbons. It had an unsulfonatable residue of about 82% as determined by ASTM Test Method D483-40, and a viscosity of about 50 seconds Saybolt Universal at 100° F.

The coupling agent was commercial grade ethylene glycol monobutyl ether sold commercially under the name "Butyl Cellosolve."

The surface-active agent was the product produced by heating sorbitol with a substantially equimolecular proportion of oleic acid under conditons to cause the formation of a monocyclic inner ether of sorbitol and mono-esterification of the sorbitol; the resulting reaction product was heated under condensation conditions with from 3 to 6 molecular proportions of ethylene oxide to cause polyethenoxy chain radicals to form and replace the hydrogen atoms of the remaining hydroxyl groups of the etherified and esterified sorbitol residue. The surface-active agent therefore essentially comprised a monocyclic inner ether of sorbitol of which the hydrogen of one hydroxyl group was replaced by an oleyl radical and the hydrogen of the remaining hydroxyl groups were replaced by polyethenoxy chain radicals corresponding in amount to from about 3 to about 6 mols of ethylene oxide per mol of esterified inner ether of sorbitol.

The above ingredients in the indicated proportions were mixed together at room temperature and pressure to form the concentrate. The concentrate was extremely stable, and a portion thereof which was set aside showed no separation of any of its ingredients after standing for several months. The concentrate was poured into an amount of water sufficient to provide a concentration of 0.1% of the butyl ester of 2,4 dichlorophenoxy acetic acid; moderate manual agitation for a few minutes provided a creamy-white dispersion which showed no sign of separation after several hours. The dispersion was sprayed on the aerial portions of several species of the plants. Immediately after spraying, the dispersion wet the plant surfaces and spread thereon in the manner described hereinafter. After the water had evaporated, the carrier material residue and toxic agent were found to be uniformly spread on the plant surfaces. A complete and uniform kill of the plants occurred in from a few days to three weeks.

*Example 2*

A concentrate was prepared having the following composition by weight:

10% of butyl 2,4 dichlorophenoxy acetate
90% of carrier material of the following composition:
 Oil, 83.3%
 Coupling agent, 11.1%
 Surface-active agent, 5.6%

The oil and surface-active agent were the same as those of Example 1. The coupling agent comprised a mixture of equal parts by volume of "Butyl Cellosolve" and isopropyl alcohol.

The concentrate had the characteristics of that of Example 1. A dispersion containing 0.1% of the butyl ester was prepared as in Example 1 and had the same characteristics.

*Example 3*

A concentrate was prepared which had the following composition, all parts being given by weight:

50% of butyl 2,4 dichlorophenoxy acetate
50% of a carrier material of the following composition:
 Oil, 70%
 Coupling agent, 20%
 Surface-active agent, 10%

The oil, coupling agent, and surface-active agent were the same as those in Example 1.

The concentrate and dispersions prepared from the concentrate had the same characteristics as those of Example 1.

*Example 4*

A concentrate was prepared which had the following composition, all parts being by weight:

80% of butyl 2,4 dichlorophenoxy acetate
20% of a carrier material of the following composition:
 Oil, 25%
 Coupling agent, 50%
 Surface-active agent, 25%

The oil and surface-active agent were the same as those of Example 1. The coupling agent comprised a mixture of equal parts by volume of isopropyl and tertiary butyl alcohol. The ingredients were thoroughly mixed together while heating to about 55° C. until the butyl 2,4 dichlorophenoxy acetate dissolved. The resulting concentrate was a clear, homogeneous composition which was highly stable at ordinary temperatures.

The concentrate was mixed with sufficient water to form a dispersion containing 1.0% by weight of the active ingredient. This dispersion, which was of high stability, had excellent herbicidal properties.

*Example 5*

A concentrate having the following composition was prepared, all proportions being by weight:

10% of butyl 2,4 dichlorophenoxy acetate
90% of a carrier material of the following composition:
 Oil, 71.5%
 Ethylene glycol monobutyl ether, 10.0%
 Ethylene glycol monoethyl ether, 10.0%
 Surface-active agent, 8.5%

The oil was the same as that of Example 1. The coupling agent consisted of ethylene glycol monobutyl ether and ethylene glycol monoethyl ether. The surface-active agent was different from that of Example 1.

The surface-active agent was the product produced by heating sorbitol with a substantially equimolecular proportion of stearic acid under conditions to cause formation of a mono-cyclic inner ether of sorbitol and mono-esterification of the sorbitol; the resulting reaction product was heated under condensation conditions with four molecular proportions of ethylene oxide to cause polyethenoxy chain radicals to form and replace the hydrogen atoms of remaining hydroxyl groups of the etherified and esterified sorbitol residue. The surface-active agent therefore essentially comprised a mono-cyclic inner ether of sorbitol of which the hydrogen of one hydroxyl group was replaced by a stearyl radical and the hydrogen of some or all of the remaining hydroxyl groups were replaced by polyethenoxy chain radicals corresponding in amount to 4 mols of ethylene oxide per mol of esterified inner ether of sorbitol. It was a solid at room temperature.

The above concentrate ingredients are heated together to about 55° C. until the solid surface-active agent was dissolved into the system. The resulting concentrate was extremely stable.

The concentrate was mixed with sufficient water to form a dispersion containing 0.1% of butyl 2,4 dichlorophenoxy acetate. The dispersion was stable and showed no separation after several hours. It was an effective selective herbicide spray.

*Example 6*

A concentrate was prepared having the following composition by weight:

15% of a dichloro - diphenyl - trichloroethane (DDT)
85% of a carrier material of the following composition:
 Oil, 82.4%
 Coupling agent, 11.7%
 Surface-active agent, 5.9%

The oil, coupling agent, and surface-active agent were the same as those of Example 1. The above ingredients in the above proportions were mixed together and heated to about 55° C. until the DDT dissolved.

The resulting concentrate was stable and showed little tendency to separate on several days' standing.

The concentrate was mixed with sufficient water to form a highly stable dispersion containing 1% of DDT and useful as a highly effective insecticidal spray which would not damage plants.

Example 7

A concentrate was prepared which had the following concentration by weight:

25% of chlorinated naphthalene ($C_{10}H_6Cl_3$)
75% of a carrier material having the following composition:
 Oil, 80.00%
 Coupling agent, 13.34%
 Surface-active agent, 6.66%

The oil, coupling agent, and surface-active agent had the compositions of those of Example 1.

The above ingredients were mixed together at room temperature until a clear composition resulted. The resulting concentrate was extremely stable.

The concentrate was mixed with sufficient water to form a dispersion containing 1% of the chlorinated naphthalene. The dispersion showed no separation on several hours' standing and was an effective insecticidal spray which had no deleterious effects on plants to which it was applied.

Example 8

This example involves a concentrate having the following composition by weight:

10% of dinitro-ortho-cresol
90% of a carrier material of the following composition:
 Oil, 83.3%
 Coupling agent, 11.1%
 Surface-active agent, 5.6%

The oil and surface-active agent were the same as those of Example 1. The coupling agent was diacetone alcohol.

The above ingredients in the proportions indicated were mixed together and heated to about 80° C. until the dinitro-ortho-cresol dissolved. The concentrate had good stability.

Sufficient water was added to and mixed with the concentrate to form a dispersion containing 1% of the active ingredient. The resulting dispersion had good stability over a period of several hours. It could be used as an effective agricultural spray for herbicidal, fungicidal or plant growth stimulating purposes.

Example 9

A concentrate having the following composition was prepared:

14% of the butyl ester of alpha naphthalene acetic acid
86% of a carrier material of the following composition:
 Oil, 76.8%
 Coupling agent, 11.6%
 Surface active agent, 11.6%

The oil, coupling agent, and surface-active agent were the same as those of Example 1.

The above ingredients in the above proportions were mixed together at room temperature; a clear, highly stable concentrate resulted.

This concentrate was mixed with sufficient water to form a dispersion containing 0.1% of the active ingredient. This dispersion had excellent stability. The active ingredient could be effectively applied to plants by spraying of such a dispersion on the plants; the effects on plants caused by the active ingredient, which is a hormone-like growth regulator, would vary with the spray rate and species of plants, from death of plants to growth stimulation.

Example 10

The concentrate of this example was the same as that of Example 9, except that the active ingredient was the butyl ester of indole-3-acetic acid. The concentrate was prepared in the same manner as that of Example 9, and the resulting concentrate and water dispersion prepared therefrom were highly stable. The dispersion could be sprayed on plants to apply effectively the butyl ester of indole-3-acetic acid, a hormone-like growth regulator, to obtain desired effects on the plants.

Example 11

A concentrate was prepared which had the following composition by weight:

10% butyl ester of beta naphthoxy acetic acid
90% of a carrier material having the following composition:
 Oil, 60.6%
 Coupling agent, 30.3%
 Surface-active agent, 9.1%

The oil and surface-active agent were the same as those of Example 1. The coupling agent was propylene glycol isopropyl ether.

The above ingredients in the indicated proportions were mixed together at a moderately elevated temperature until a clear, highly stable concentrate resulted.

This concentrate was mixed with sufficient water to form a dispersion containing a concentration of 0.1% of the butyl ester of beta naphthoxy acetic acid, a hormone-like growth regulator. By spraying this dispersion on plants, an effective application of this active ingredient could be made.

FUNCTIONS AND ADVANTAGES OF CARRIER MATERIAL AND CONCENTRATE OF INVENTION

The carrier material of the invention, particularly when it has dispersed therein an active ingredient to form a concentrate, provides numerous important and unique advantages.

Carrier material and concentrate as such

The carrier material is made of materials which are readily available commercially at reasonable prices; and as indicated above can be prepared with little difficulty and with no requirements for special equipment. Consequently, the costs of the carrier material and concentrate embodying it are relatively low.

The carrier material itself is extremely stable, apparently because its component materials are of such a nature and combined in such proportions that they are highly miscible; even on standing for several months little, if any, separation of the component materials results. Concentrates containing the carrier material and an active ingredient which is substantially soluble in the carrier material show little, if any, separation of the components or crystallization of the active ingredient on standing for long periods of time. Concentrates containing the carrier material and a finely divided solid active ingredient insoluble in the carrier material are also of improved stability, and resist separation of the active ingredient on long standing if the active ingredient is of sufficiently small particle size.

Apparently because it is made up of non-ionic materials and contains no more than traces of water, the carrier material does not harmfully affect the active ingredient when incorporated with it in a concentrate, and does not corrode or otherwise deteriorate metal.

*Dispersions before application to plants*

The concentrate containing the carrier material can be mixed with water or other suitable liquid in a wide range of proportions to form exceptionally stable dispersions containing the active ingredient and carrier material, this even though the active ingredient itself is insoluble or immiscible in water. Because of its inert nature, the carrier material in such dispersions does not harmfully affect the active ingredient or metal vessels containing the dispersions. Such dispersions therefore may stand for many hours with little or no separation or deterioration, and hence may be prepared and used when convenient, without the necessity of preparing them immediately prior to use. The amount of water or other diluent with which the concentrate may be mixed may vary widely, being largely determined by the amount of active ingredient in the concentrate and the concentration of active ingredient desired in the ultimate dispersion.

No intensive mixing or special mixing equipment is necessary to mix the concentrate and water to form a stable dispersion. The concentrate can be merely added to the water and moderately agitated for a short time, manually if desired, and a complete and stable dispersion results. Consequently, the dispersions to be applied to plant surfaces can be prepared at or in the vicinity of the point of application, thus avoiding the necessity of hauling large volumes of prepared dispersions for long distances from the point of preparation to the point of application. Successful application of the carrier has been made from a 5 gallon to a 100 gallon per acre spreading rate.

Because of the physico-chemical nature of the carrier material, hard water has little or no deleterious effect on the stability of the dispersion; for instance, the stability is affected only slightly by even very hard water (more than 200 P. P. M. calculated to $CaCO_3$). Consequently, no special precautions need be taken in the selection of the water to be mixed with the concentrate, which is an important advantage in agricultural operations.

Dispersions prepared from concentrates embodying the invention may be readily sprayed with standard equipment; indeed, such dispersions may even be effectively sprayed by equipment having spray nozzles with extremely fine openings.

*Dispersion after application to plants*

When a dispersion produced from a concentrate embodying the carrier material of the invention is applied to plant surfaces, as by spraying, such plant surfaces are thoroughly wetted. The dispersion spreads on the plant surfaces in a thin film, or forms tiny, flat, closely and uniformly spaced droplets, to cause a uniform dosage of dispersion on the plant surfaces. Evaporation of water and volatile coupling agent from a dispersion in water causes the deposition on the plant surfaces of a thin coating of uniformly distributed carrier material residue, consisting of the oil and surface-active agent, and having dispersed therein the active ingredient. The coating may be substantially continuous, or may be made up of tiny, closely spaced spots resulting from the evaporation of the volatile liquids from the previously mentioned droplets. In either case, the dosage of active ingredient on the plant surface is substantially uniform over the whole surface to which the dispersion was applied. The above described results are in marked contrast to those obtained with most, if not all, other dispersions heretofore employed. Application of prior art dispersions to plant surfaces generally caused the formation of relatively large, irregular drops containing the active ingredient, apparently due to insufficient wetting of the plant surface or excessive coheasive properties of the liquid. Such dispersions because of non-uniformity of deposition were wasteful of the active ingredient carried therein.

The carrier material residue remaining on the plant surface after evaporation of the liquids and having the active ingredient dispersed therein, firmly adheres the active ingredient to the plant surface for a substantial period. Therefore, it is permitted to perform its intended function, as by being absorbed into the plant if it is one which requires absorption for functioning, or by remaining on the plant surface if it is one which is to remain thereon as to protect the plant from insects or fungi.

This residue also is highly stable so that for a substantial period the residue is little affected by variations in environmental conditions such as temperature or moisture. Therefore, the rate of release from the residue of an active ingredient absorbed by the plant is not greatly affected by such changes in environmental conditions.

The carrier material residue itself has low physiological activity in relation to plant tissues. Therefore, the carrier material of the invention provides exceptional advantages when employed in conjunction with active ingredients the application of which to plants is intended to leave the plants unharmed; examples of such active ingredients are those having ergocrine or growth regulator, preservative, insecticidal, fungicidal, or selective herbicidal properties.

It has been found through experience that the carrier material residue acts to aid penetration of the active ingredient into the plant, when the active ingredient is one which requires absorption into the plant for operation. The mechanism of this action is not clear. However, the carrier material residue maintains the thorough dispersion of the active ingredient so that its penetration into the plant is not impaired by the carrier which may in effect cauterize contiguous plant tissue and in certain instances prevent adsorption and translocation of the active agent.

The carrier material residue, as well as the carrier material in dispersion, also possesses to a pronounced extent the ability to penetrate waxy films or coatings such as are often present on the surfaces of certain plants and waxy or hairy layers such as are often present on the bodies of insects, and to carry the active ingredient with it. Consequently, the effectiveness of the active ingredient is promoted under such conditions, which would otherwise reduce the effectiveness of the active ingredient.

Furthermore, the carrier material residue prevents the active ingredient from drying out for a considerable period of time after application to a plant; since most active ingredients become considerably less effective when dry, the carrier material is advantageous in this respect.

Moreover, the carrier material residue, apparently because of its physico-chemical characteristics, does not harmfully affect the active ingredient or its activity. The inertness of the carrier material of the invention toward the active ingredient in the concentrate, dispersion or residue remaining on the plant surfaces is in marked contrast to the activity of many other adjuvants, which because of their acid or alkaline nature, harmfully affect the active ingredient.

For these reasons, the effectiveness of the active ingredient is prolonged and enhanced by the carrier material of the invention. Consequently, to accomplish a given result, a smaller amount of active ingredient can be employed, with a resultant saving in the cost of the active ingredient. Moreover, since smaller amounts of active ingredient are required, smaller amounts of carrier material and of water are required; this also reduces the cost of the application, because of the savings in costs of carrier material, transportation of water, and labor.

*Action of carrier material in inhibiting deleterious effects of water after application*

Other unusual functions and advantages are exhibited by the carrier material of the invention. Although the carrier material makes possible an extraordinarily high degree of dispersion of the active ingredient in water for application to plant surfaces, after application of the dispersion to plants the carrier material residue surprisingly inhibits reduction of the effectiveness of the active ingredient by water thereafter applied to the plant or surrounding the plant.

Thus, after a dispersion containing the active ingredient and carrier material of the invention has been applied to plant surfaces, as by spraying, and liquids such as water and the coupling agent have evaporated from the plant surfaces, the carrier material residue having dispersed therein the active ingredient and remaining on the plant surfaces resists removal or washing off of the active ingredient from the plant surfaces by water subsequently applied, as from rainfall or subsequent sprinkling of the plants. A major disadvantage of many prior dispersions is thus avoided; indeed, in many cases a heavy rainfall after application of prior dispersions removes so much of the active ingredient as to render the application ineffective and to necessitate respraying with an attendant added cost.

This property of the carrier material in inhibiting reduction of effectiveness of the active ingredient by water after application of active ingredient to plants also makes possible the effective application of active ingredients to plants surrounded by or growing in water. Aquatic weeds may thus be killed. It has been found, for example, that if fields containing rice plants and weeds growing in water are sprinkled or sprayed with proper dosages of dispersions containing proper concentrations of a carrier material embodying the invention and an active herbicidal ingredient consisting of one or more of certain halogenated phenoxy monocarboxylic acids or their derivatives such as the butyl ester of 2,4 dichlorophenoxy acetic acid, the weeds may be killed without harm to the rice plants. It is believed that the oily carrier material residue having the active ingredient dispersed therein floats on the surface of the water in the rice fields and contacts and clings to the weeds in such amounts that the active ingredient in the residue can kill the weeds. Because of the selective action of the active ingredient, the rice plants are not killed. Thus, the carrier material of the invention possesses the unique property of permitting high dispersion of the active ingredient in water for application purposes, but yet preventing the active ingredient from being so diluted by the water surrounding the plants to be treated as to render the active ingredient ineffective.

ADDED FUNCTIONS AND ADVANTAGES OF CARRIER MATERIAL WHEN EMPLOYED WITH HALOGENATED PHENOXY ACID ESTERS

The carrier material of the invention provides particularly outstanding advantages along the lines discussed above when employed in conjunction with active ingredients comprising certain aliphatic esters of certain halogenated phenoxy monocarboxylic acids. The acids are those which have hormone-like or herbicidal properties, depending on the dosage applied to plants. Although other esters may be used, particular advantages are provided if the esterifying alkyl radical has at least four and no more than 20 carbon atoms. An example of such an ester is butyl 2,4 dichlorophenoxy acetate. Such esters are considerably more soluble in the carrier material of the present invention and particularly in the oil thereof than are the acids themselves or other esters or other derivatives of such acids. Hence, concentrates embodying such esters and carrier materials of the invention, and dispersions prepared from such concentrates, are extremely stable. Moreover, such esters are of an oily nature and have low water solubility; hence, after they have been applied to plant surfaces in a dispersion containing the carrier material, they assist the carrier material residue in resisting removal of the esters from the plant surfaces because of rainfall or subsequently applied water. Moreover, because of their oily nature, the esters do not dry as readily as do the corresponding acids; hence the esters penetrate the plant tissue even more readily than do the acids or other derivatives of the acids when held on the plant by the carrier material residue. For this reason and others, such esters are more effective when employed with the carrier material of the invention than the corresponding acids or other derivatives. Particular advantages along these lines are provided when concentrates are employed which contain the carrier material of the invention and such an ester in a proportion constituting from about 6% to about 400% of the weight of the carrier material. Concentrates having greater or lesser proportions of such ester are of lesser stability.

The present invention thus provides carrier materials and concentrates which possess numerous important and unique advantages, and which overcome the shortcomings of prior carrier materials, concentrates, dispersions and practices employing them.

While the carrier materials and concentrates including such carrier materials embodying the invention were discussed above largely in connection with their dispersion in water as a diluent and dispersion medium, they may be dispersed in other diluents. For example, the carrier materials or concentrates of the present invention may be readily mixed with certain petroleum oils to form dispersions of the active ingredient in oil for applications where the use of oil as a diluent is advantageous.

Without departing from the spirit of the invention, various modifications other than those indicated above may be made in the above described carrier materials, concentrates, methods of making them or their constituents, and methods of applying them to plants. The invention is not intended to be limited thereto, but to be limited only by the scope of the appended claims.

This application is a continuation-in-part of our application Serial No. 718,882, filed December 27, 1946 and now abandoned.

What is claimed is:

1. A substantially water-free liquid composition capable of forming a stable dispersion in water for application to plant surfaces by spraying, comprising essentially a hydrocarbon spray oil containing a major proportion of paraffinic constituents and not more than about 25% sulfonatable material and having a viscosity of from about 40 seconds to about 70 seconds Saybolt Universal at 100° F., a coupling agent, a surface active agent of the type obtained by reacting 3 to 6 mol proportions of ethylene oxide with 1 mol proportion of a monoalkyl ester of cyclic inner ethers of a hexitol in which the alkyl radical is a straight chain 18 carbon atom fatty acid residue, said coupling agent effecting a mutual solvency between said spray oil and said surface active agent, the proportion of said surface active agent being from about 20% to about 200% by weight of the coupling agent and said surface active agent and coupling agent together being from about 20% to about 300% by weight of the spray oil, and at least one agricultural chemical miscible therewith suitable for application to plant surfaces by spraying in an amount of from about 2% to about 400% by weight of the remainder of the composition.

2. A liquid composition as claimed in claim 1 wherein the alkyl radical of the surface active agent is oleyl.

3. A liquid composition as claimed in claim 1 wherein the alkyl radical of the surface active agent is stearyl.

4. A liquid composition as claimed in claim 1 wherein the cyclic inner ethers of a hexitol are cyclic inner ethers of sorbitol.

5. A liquid composition as claimed in claim 1 wherein the coupling agent contains at least one compound selected from the group consisting of alkylene glycol alkyl ethers and alcohols having up to 8 carbon atoms.

6. A liquid composition as claimed in claim 5 wherein the coupling agent is ethylene glycol monobutyl ether.

7. A liquid composition as claimed in claim 5 wherein the coupling agent is a mixture of ethylene glycol monobutyl ether and isopropyl alcohol.

8. A liquid composition as claimed in claim 1 wherein the surface active agent is a compound of the type obtained by reacting one mol proportion of mono-oleyl ester of cyclic inner ethers of sorbitol with three to six mol proportions of ethylene oxide.

9. A liquid composition as claimed in claim 8 wherein the ester is a mono-oleyl ester of monocyclic inner ethers of sorbitol.

10. A liquid composition as claimed in claim 1 wherein the spray oil contains not less than about 15% sulfonatable material.

11. A liquid composition as claimed in claim 1 wherein the agricultural chemical comprises at least one alkyl ester of halogenated phenoxy aliphatic monocarboxylic acid.

12. A liquid composition as claimed in claim 11 wherein the agricultural chemical comprises at least one alkyl ester of 2,4 dichlorophenoxy acetic acid.

13. A liquid composition as claimed in claim 12 wherein the agricultural chemical comprises the butyl ester of 2,4 dichlorophenoxy acetic acid.

14. A liquid composition as claimed in claim 1 wherein the agricultural chemical comprises dichloro diphenyl trichlorethane.

15. A substantially water-free liquid composition capable of forming a stable dispersion in water for application to plant surfaces by spraying, comprising essentially a hydrocarbon spray oil containing a major proportion of paraffinic constituents and from about 15% to about 25% sulfonatable material and having a viscosity of from about 40 seconds to about 70 seconds Saybolt Universal at 100° F., ethylene glycol monobutyl ether, a surface active agent of the type obtained by reacting 3 to 6 mol proportions of ethylene oxide with 1 mol proportion of the mono-stearyl ester of mono-cyclic inner ethers of sorbitol, said ethylene glycol monobutyl ether effecting a mutual solvency between said spray oil and said surface active agent, the proportion of said surface active agent being from about 20% to about 200% by weight of the ethylene glycol monobutyl ether and said surface active agent and ethylene glycol monobutyl ether together being from about 20% to about 300% by weight of the spray oil, and the butyl ester of 2, 4 dichlorophenoxy acetic acid in an amount of from about 2% to about 400% by weight of the remainder of the composition.

DONALD A. KOHR, JR.
ROY L. MILDE.

REFERENCES CITED

The following references are of record in the file of this patent:

UNITED STATES PATENTS

| Number | Name | Date |
| --- | --- | --- |
| 1,965,935 | Blount et al. | July 10, 1934 |
| 2,044,959 | Tisdale et al. | June 23, 1936 |
| 2,369,429 | Boissonou | Feb. 13, 1945 |
| 2,380,166 | Griffin | July 10, 1945 |
| 2,390,941 | Jones | Dec. 11, 1945 |
| 2,423,144 | Gregg | July 1, 1947 |